US012172330B2

(12) United States Patent
Wu et al.

(10) Patent No.: US 12,172,330 B2
(45) Date of Patent: Dec. 24, 2024

(54) SECURING STRUCTURE OF FOLDING KNIFE

(71) Applicant: CUTTWAY PRODUCTS CO., LTD., Taichung (TW)

(72) Inventors: Race Wu, Taichung (TW); Jonathan Chang, Taichung (TW)

(73) Assignee: CUTTWAY PRODUCTS CO., LTD., Taichung (TW)

( * ) Notice: Subject to any disclaimer, the term of this patent is extended or adjusted under 35 U.S.C. 154(b) by 0 days.

(21) Appl. No.: 17/889,510

(22) Filed: Aug. 17, 2022

(65) Prior Publication Data

US 2024/0017429 A1 Jan. 18, 2024

(30) Foreign Application Priority Data

Jul. 13, 2022 (TW) ................................ 111207495

(51) Int. Cl.
*B26B 1/04* (2006.01)

(52) U.S. Cl.
CPC .............. *B26B 1/048* (2013.01); *B26B 1/042* (2013.01)

(58) Field of Classification Search
CPC ........... B26B 1/06; B26B 1/048; B26B 1/042; B26B 1/044; B26B 1/02; B26B 1/04
USPC .................................................... 30/160, 164
See application file for complete search history.

(56) References Cited

U.S. PATENT DOCUMENTS 730,025 A * 6/1903 Kaufmann .............. B26B 1/046 30/161
1,189,005 A * 6/1916 Seely ...................... B26B 23/00 30/308.2
1,431,835 A * 10/1922 Neft ........................ B26B 1/048 30/160
1,647,405 A * 11/1927 Giesen .................... B26B 1/048 30/160
5,502,895 A * 4/1996 Lemaire .................. B26B 1/044 30/158
5,615,484 A * 4/1997 Pittman ................... B26B 1/048 30/344
5,822,866 A * 10/1998 Pardue .................... B26B 1/048 30/160

(Continued)

FOREIGN PATENT DOCUMENTS

FR 2403874 * 5/1979 ............ B26B 1/046

*Primary Examiner* — Ghassem Alie
*Assistant Examiner* — Samuel A Davies
(74) *Attorney, Agent, or Firm* — Birch, Stewart, Kolasch & Birch, LLP

(57) ABSTRACT

A securing structure of a folding knife includes a blade and a handle. The blade is pivotally connected to the handle and has a pivotal connection end provided with a first engaging groove and a second engaging groove. The handle has two opposite sides each provided with a first guide hole. A stop block is provided in the handle and has a stop surface for abutting against an abutting surface of the blade. The stop block also has an inclined guide surface. The inclined guide surface is adjacent to the first guide holes and is inclined in a direction from the upper handle edges toward the front handle ends. A pin extends through the two first guide holes and can be engaged in either one of the first and the second engaging grooves and thereby clamped between a wall portion of the engaging groove and the inclined guide surface.

4 Claims, 15 Drawing Sheets

(56) References Cited

U.S. PATENT DOCUMENTS 5,915,792 A * 6/1999 Sakurai .................... B26B 1/048 30/155
6,079,106 A * 6/2000 Vallotton ................ B26B 1/048 30/155
6,122,829 A * 9/2000 McHenry ................ B26B 1/048 30/160
6,574,869 B1 * 6/2003 McHenry ................ B26B 1/048 30/160
6,918,184 B2 * 7/2005 Glesser ..................... B26B 1/04 30/161
7,059,053 B2 * 6/2006 Sakai ....................... B26B 1/048 30/160
7,062,857 B1 * 6/2006 Nenadic .................. B26B 1/042 30/298.4
7,107,686 B2 * 9/2006 Linn ........................ B26B 1/044 30/159
7,124,509 B1 * 10/2006 Hawk ..................... B26B 1/048 30/159
7,140,110 B2 * 11/2006 Lake ....................... B26B 1/042 30/160
7,243,430 B1 * 7/2007 Lerch ...................... B26B 1/046 30/159
7,340,837 B1 * 3/2008 Busse ..................... B26B 1/048 30/160
7,380,340 B1 * 6/2008 Lerch ........................ B26B 1/02 30/159
7,694,421 B2 * 4/2010 Lin ......................... B26B 1/046 30/159
8,572,851 B2 11/2013 Duey
8,745,878 B2 * 6/2014 Glesser ................... B26B 1/048 30/155
9,079,320 B2 * 7/2015 Onion ..................... B26B 1/044
9,302,399 B2 * 4/2016 Kao ........................ B26B 1/044
9,327,413 B2 * 5/2016 Sakai ...................... B26B 1/042
9,505,141 B2 * 11/2016 Duey ...................... B26B 1/048
9,527,218 B2 * 12/2016 Valdez .................... B26B 1/044
9,573,282 B1 * 2/2017 Sheahan ................... B26B 1/02
9,862,104 B2 1/2018 France
9,908,245 B1 * 3/2018 Tkachenko ............. B26B 1/044
9,943,970 B2 * 4/2018 Glesser ................... B26B 1/048
10,632,632 B1 * 4/2020 Demko ................... B26B 1/048
11,123,884 B1 * 9/2021 Mollick .................. B26B 1/048
11,673,280 B1 * 6/2023 Randall ..................... B26B 1/04 30/161
11,883,967 B2 * 1/2024 Douglas .................. B26B 1/048
2003/0070299 A1 * 4/2003 Frazer ..................... B26B 1/048 30/160
2004/0134075 A1 * 7/2004 Chu ........................ B26B 1/048 30/160
2005/0055833 A1 * 3/2005 Scarla ..................... B26B 1/048 30/330
2005/0097754 A1 * 5/2005 Onion ....................... B26B 1/02 30/159
2005/0194238 A1 * 9/2005 Frazer ..................... B26B 1/048 200/48 A
2005/0262701 A1 * 12/2005 Lai .......................... B26B 1/048 30/161
2017/0312925 A1 * 11/2017 Kao .......................... B26B 1/04
2018/0133907 A1 * 5/2018 Kao .......................... B26B 1/02
2022/0126462 A1 * 4/2022 McKay ................... B26B 1/044

* cited by examiner

SECURING STRUCTURE OF FOLDING KNIFE

BACKGROUND OF THE INVENTION

1. Technical Field

The present invention relates to a folding knife and more particularly to a securing structure of a folding knife.

2. Description of Related Art

Folding knives are in extensive use because of their ease of use, convenient storage, and high portability, and they differ from one manufacturer to another in how the blade is rotated and secured. One way to secure the blade of a folding knife is to use a locking pin, as disclosed in U.S. Pat. Nos. 8,572,851 and 9,862,104. Take the structure of U.S. Pat. No. 8,572,851 for example. The main structural features of a folding knife having such a structure include a handle and a blade, wherein the blade is pivotally connected to one end of the handle and can be rotated with respect to the handle. The handle is penetrated by a slot that is open on two opposite sides of the handle. A pin extends through the slot, and the two ends of the pin are exposed from the two opposite sides of the handle through the slot openings respectively so as to be operated by a user. The end of the blade that is pivotally connected to the handle is provided with at least two grooves in either of which the pin can be engaged. The foregoing structure is so designed that the blade can be secured by bringing the pin into engagement in either one of the grooves of the blade and the slot of the handle. When it is desired to rotate the blade out of the handle, it is required to move the pin from one end to the other end of the slot and thereby disengage the pin from one of the grooves of the blade so that the blade can be rotated with respect to the handle.

The structure described above relies on the pin to secure the blade in place, and the pin itself is secured by engaging with a wall portion of either groove of the blade and a wall portion of the slot, which is open on the two opposite sides of the handle. This securing structure, however, is not secure not only because the blade is not sufficiently supported, but also because the pin may easily come out of the groove in which it is engaged; as a result, the blade is unstable when rotated during use.

BRIEF SUMMARY OF THE INVENTION

The primary objective of the present invention is to provide a securing structure of a folding knife, wherein the securing structure is structurally simple and has a firm securing effect.

To achieve the primary objective, the securing structure provided by the present invention for a folding knife includes a blade and a handle. The blade has a pivotal connection end pivotally connected to the handle. The pivotal connection end of the blade is provided with a first engaging groove and a second engaging groove. The handle has two opposite sides each provided with a first guide hole. A stop block is provided in the handle. The stop block has a stop surface, and the stop surface abuts against an abutting surface of the blade when the blade is in a fully extended position. The stop block is also provided with an inclined guide surface. The inclined guide surface is adjacent to the first guide holes and is inclined from one end toward the engaging grooves of the pivotal connection end such that the end of the inclined guide surface that is adjacent to the blade is closer to the lower handle edges than is the opposite end of the inclined guide surface. A pin extends through the two first guide holes and can be engaged in either one of the first engaging groove and the second engaging groove.

The securing structure provided by the present invention for a folding knife is so designed that the pin can be guided selectively into one of the first engaging groove and the second engaging groove by the inclined guide surface and end up clamped between the inclined guide surface and a wall portion of the one of the first engaging groove and the second engaging groove, thereby preventing the blade from further rotation while the pin itself is kept from coming out of the one of the first engaging groove and the second engaging groove.

Preferably, the handle is provided with a control element connected with two linking members, and the two linking members are connected to the two ends of the pin respectively such that the pin can be driven to move by the control element.

Preferably, the handle is provided with an elastic element, and the elastic element is configured to store a restoring force for bringing the pin back in place after the pin is displaced.

Preferably, the first engaging groove and the second engaging groove are provided in an outer annular portion of the blade and form an included angle θ at least greater than 90 degrees.

DETAILED DESCRIPTION OF THE INVENTION

Figure 1:
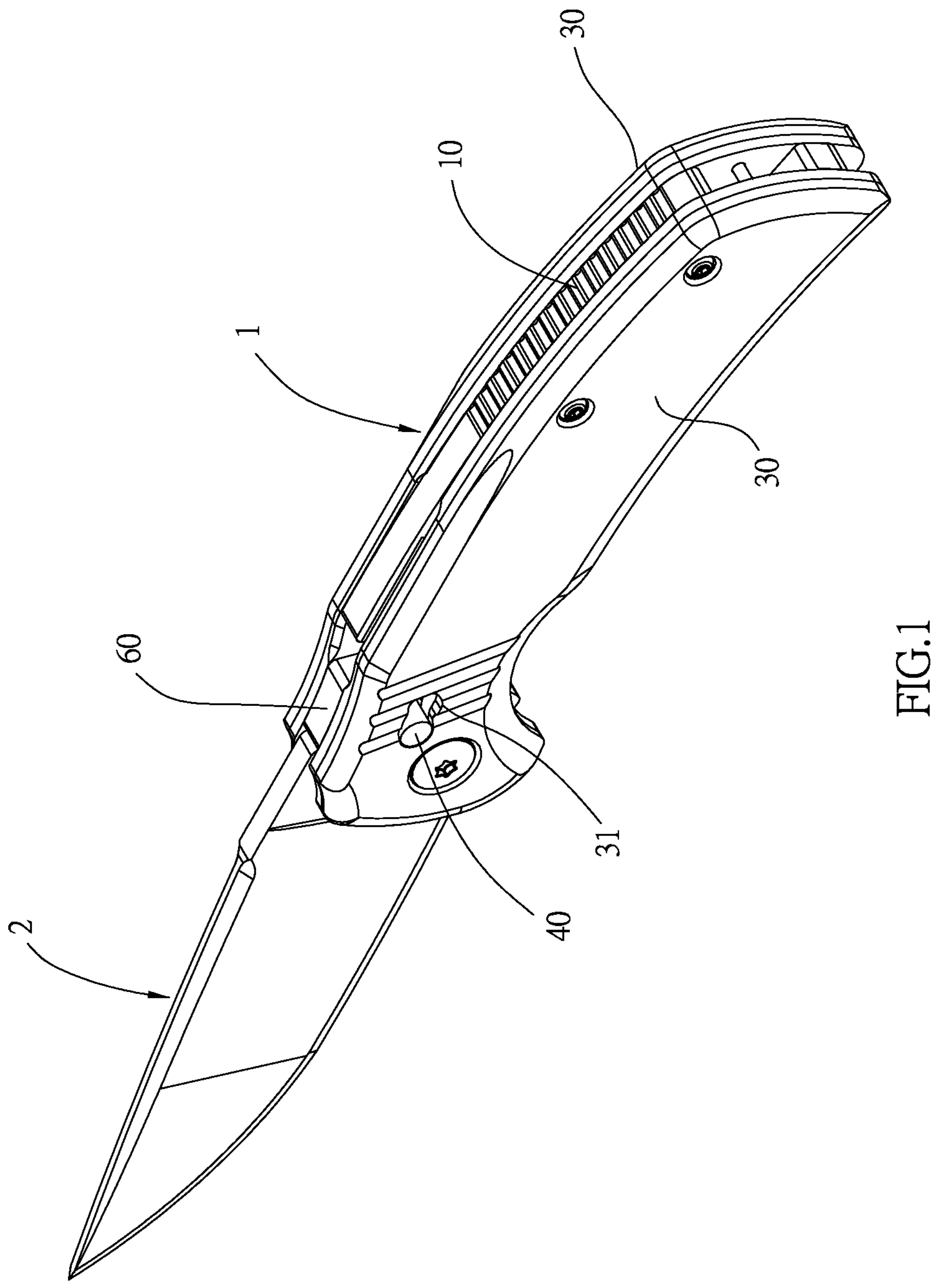
FIG. 1 is an assembled perspective view of the first embodiment of the present invention.
Figure 2:
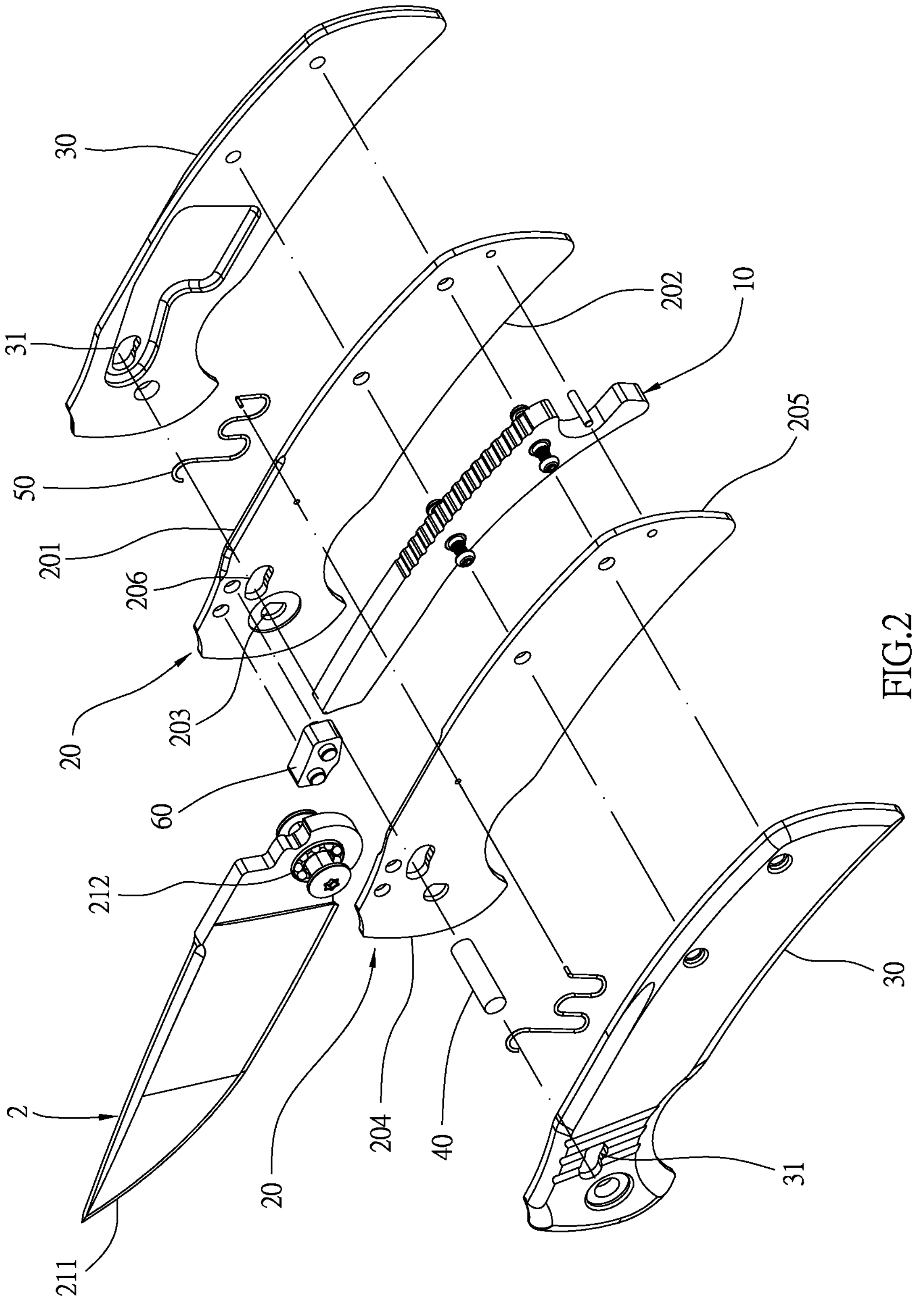
FIG. 2 is an exploded perspective view of the first embodiment of the invention.

To begin with, the applicant would like to point out that throughout this specification, including the description of the following embodiments and the appended claims, all the directional terms make reference to the directions shown in the accompanying drawings, and that identical or similar elements or structural features in the following embodiments and the drawings are indicated by the same reference numeral.

Referring to FIG. 1 to FIG. 6, a securing structure of a folding knife according to the first embodiment of the present invention includes a handle 1 and a blade 2. The blade 2 is pivotally connected to the handle 1 at one end in order to be switchable between a fully extended position and a fully folded position. The handle 1 includes a main body 10, two side plates 20, two housing portions 30, a pin 40, two elastic elements 50, and a stop block 60.

The main body 10 is elongated in shape.

The two side plates 20 are also elongated in shape and are provided on two opposite sides of the main body 10 respectively such that the main body 10 is sandwiched between the two side plates 20, with a space formed between the two side plates 20 in order to receive the blade 2. As the two side plates 20 have the same structure, only one side plate 20 is described below by way of example. The side plate 20 has two long-side edges defined respectively as an upper handle edge 201 and a lower handle edge 202. One end of the side plate 20 is provided with a pivotal connection hole 203. The end of the side plate 20 that is provided with the pivotal connection hole 203 is defined as a front handle end 204 while the opposite end of the side plate 20 is defined as a rear handle end 205. The side plate 20 is provided with an elongated first guide hole 206. The major-axis direction of the first guide hole 206 extends along the major-axis direction of the side plate 20, and the end of the first guide hole 206 that is adjacent to the front handle end 204 is slightly curved toward the lower handle edge 202.

The two housing portions 30 are elongated in shape and are provided on the outer sides of the two side plates 20 respectively such that the two side plates 20 are located between the two housing portions 30. Each housing portion 30 is provided with a guiding hole 31. The guiding holes 31 correspond in shape and position to the first guide holes 206 of the side plates 20.

The pin 40 extends through the guiding holes 31 of the two housing portions 30 as well as each first guide hole 206. The two ends of the pin 40 are exposed from the two housing portions 30 respectively.

The two elastic elements 50 are provided on the outer sides of the two side plates 20 respectively. Each elastic element 50 has one end connected to the corresponding side plate 20 and the opposite end abutting against the pin 40 in order to apply a restoring force to the pin 40 after the pin 40 is displaced. In this embodiment, the elastic elements 50 are springs. The elastic elements 50, however, are not essential. The provision of the elastic elements 50 is intended for the pin 40 to return to its original position automatically after being displaced. It is nevertheless feasible to dispense with the elastic elements 50 altogether or provide only one elastic element 50.

The stop block 60 is sandwiched between the two side plates 20 and is adjacent to the front handle ends 204. The stop block 60 has a stop surface 61. The stop surface 61 abuts against an abutting surface 217 of the blade 2 when the blade 2 is in the fully extended position. The stop block 60 is also provided with an inclined guide surface 62. The inclined guide surface 62 is adjacent to the first guide holes 206 and is inclined in a direction from the upper handle edges 201 toward the lower handle edges 202 and the front handle ends 204. The end of the inclined guide surface 62 that is adjacent to the blade 2 is closer to the lower handle edges 202 than is the opposite end of the inclined guide surface 62.

The blade 2 includes a cutting-edge end 211 and a pivotal connection end 212. The pivotal connection end 212 is provided with a pivot shaft 213 and an outer annular portion 214 surrounding the pivot shaft 213. The blade 2 is pivotally connected to the pivotal connection holes 203 of the two side plates 20 via the pivot shaft 213 and can be rotated with respect to the handle 1 about an axis defined by the pivot shaft 213. The outer annular portion 214 has a fan-like configuration extending about a center of circle defined by the pivot shaft 213. Moreover, the outer annular portion 214 is provided with a first engaging groove 215 and a second engaging groove 216, and the pin 40 can be engaged in either one of the two engaging grooves. With the pivot shaft 213 serving as the vertex, the two engaging grooves define an included angle θ therebetween, and the included angle θ is at least greater than 90 degrees. The abutting surface 217 is provided at the pivotal connection end 212.

Figure 3:
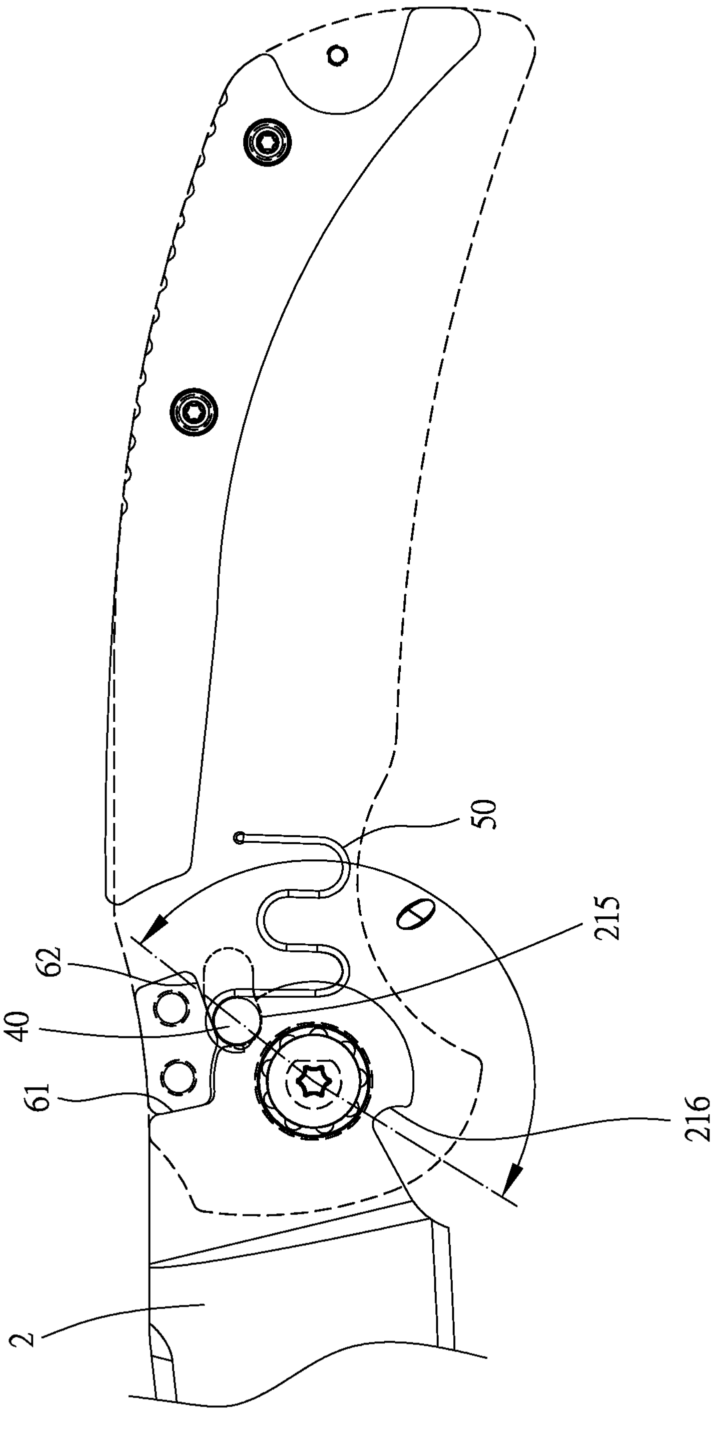
FIG. 3 is a left side view of the first embodiment of the invention, with the left housing portion removed.
Figure 4:
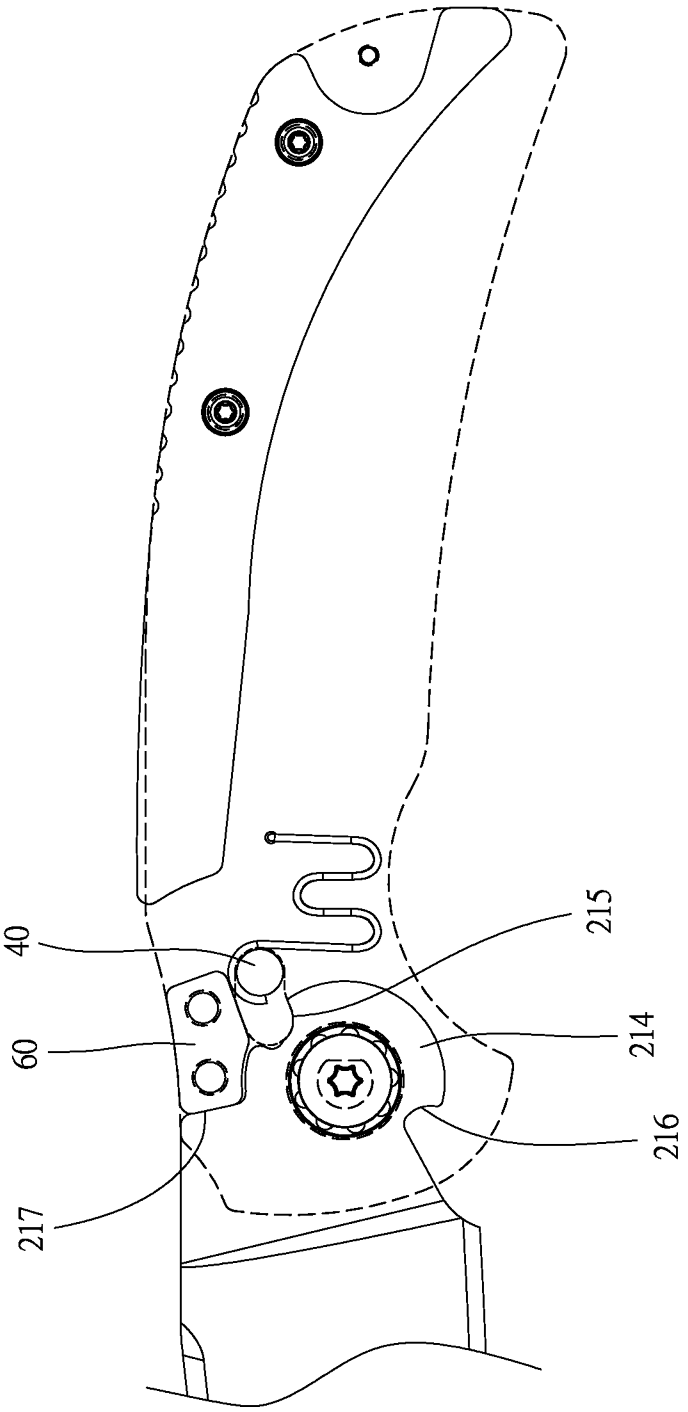
FIG. 4 is generally the same as FIG. 3 and shows the folding knife in a fully extended position.
Figure 5:
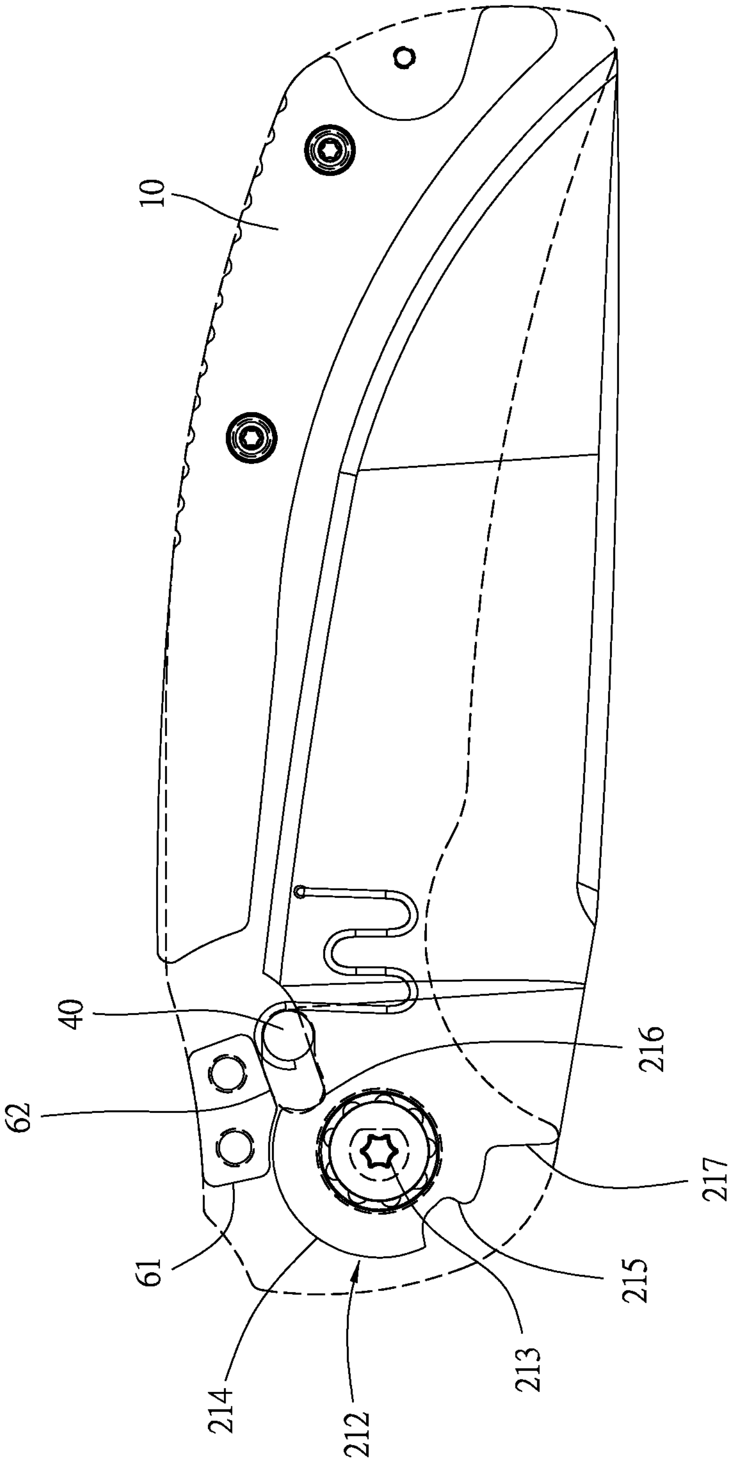
FIG. 5 is a left side view of the first embodiment of the invention, with the blade stored in the handle and in a fully folded position.
Figure 6:
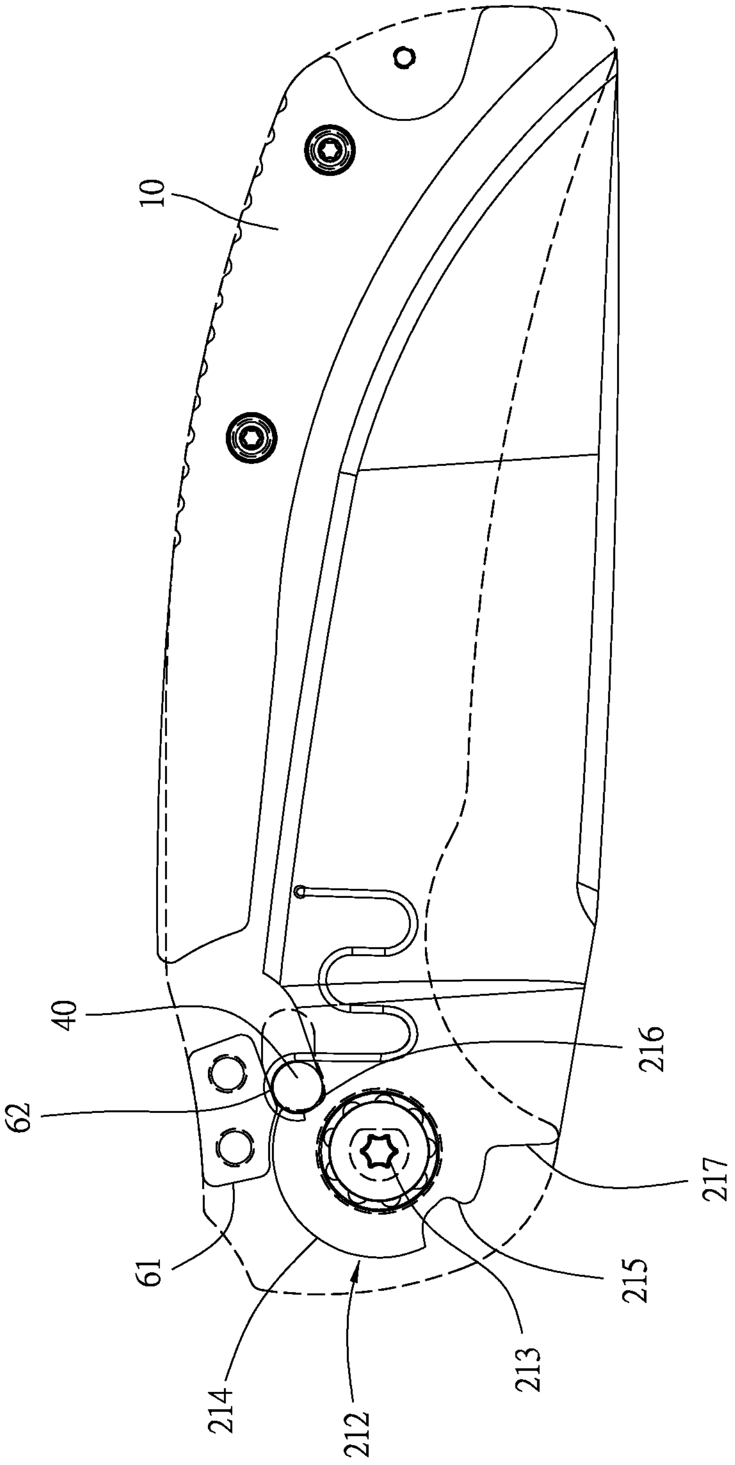
FIG. 6 is generally the same as FIG. 5 except that the blade is locked after being stored in the handle.
Figure 7:
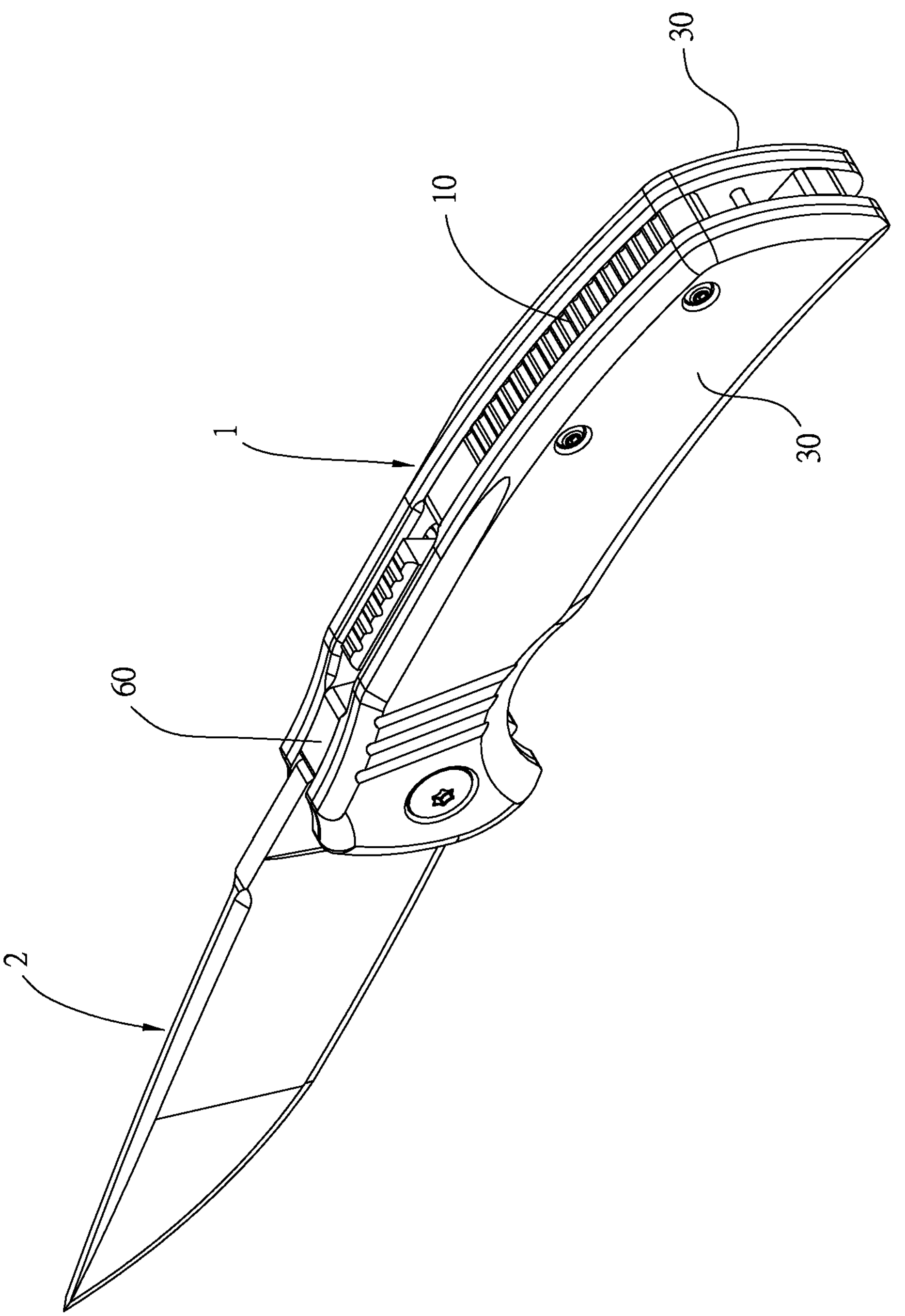
FIG. 7 is an assembled perspective view of the second embodiment of the invention.
Figure 8:
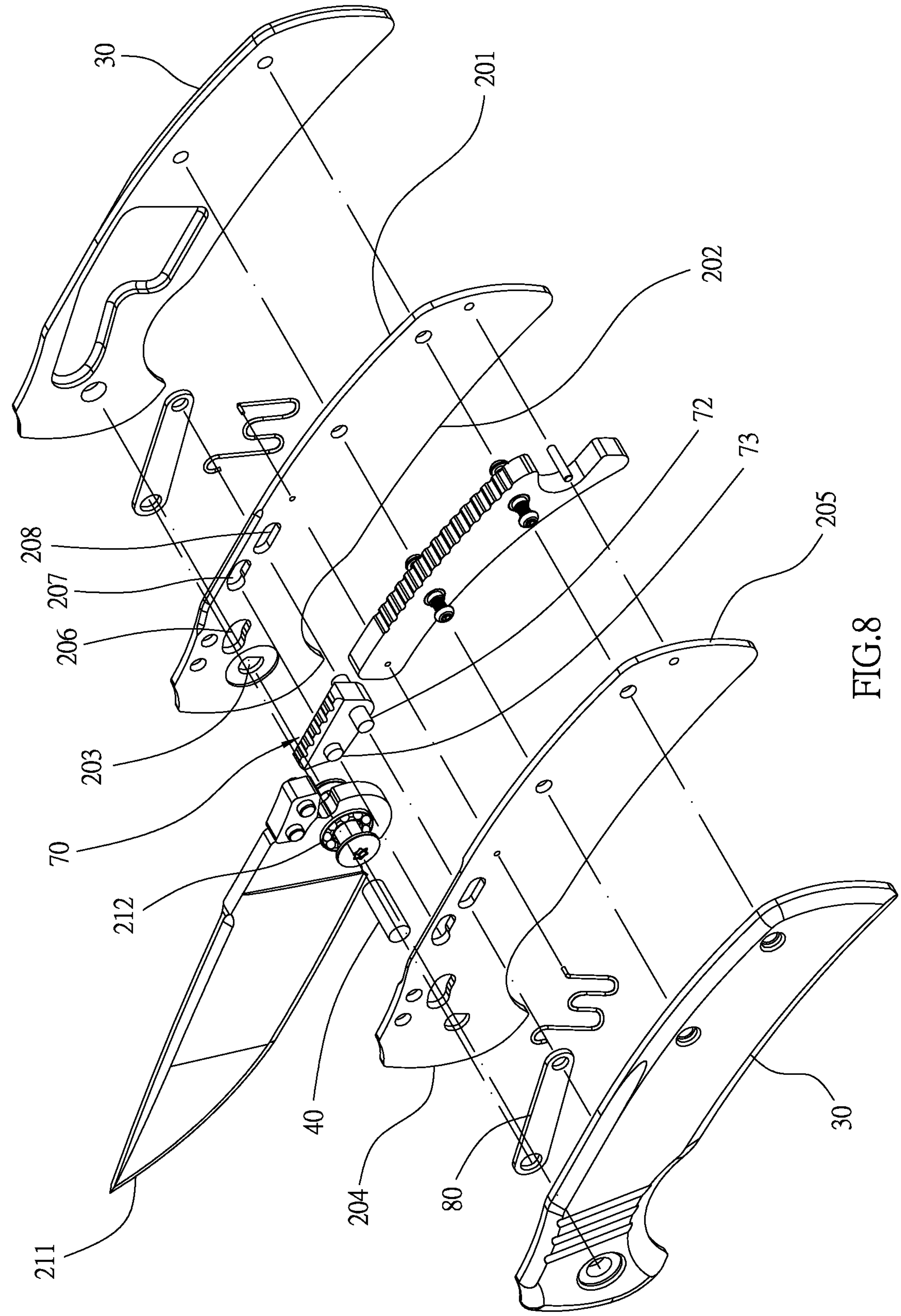
FIG. 8 is an exploded perspective view of the second embodiment of the invention.

The securing structure provided by this embodiment for a folding knife can work while the blade 2 is in the fully extended position, as shown in FIG. 3. When the blade 2 is in the fully extended position, the abutting surface 217 of the blade 2 abuts against the stop surface 61 of the stop block 60, and the pin 40 is in the first engaging groove 215 and is clamped between a wall portion of the first engaging groove 215 and the inclined guide surface 62 of the stop block 60. As the inclined guide surface 62 is inclined toward the lower handle edges 202 and therefore guides the pin 40 deeper into the first engaging groove 215, the pin 40 is secured in place and is kept from coming out of the first engaging groove 215.

To fold the blade 2, the user begins by moving the pin 40 along the first guide holes 206 of the two side plates 20 until the pin 40 is outside the first engaging groove 215, thereby allowing the blade 2 to be rotated with respect to the handle 1. Once the blade 2 is in the fully folded position after being rotated from the fully extended position, the user releases the pin 40 so that the pin 40 is pushed back to its original position by the restoring force stored in the two elastic elements 50 and ends up engaged in the second engaging hole 216. The pin 40 in this state is clamped between the inclined guide surface 62 and a wall portion of the second engaging groove 216 to prevent further rotation of the blade 2, and the pin 40 itself is kept from coming out of the second engaging groove 216.

The structure of the present invention uses multiple portions (namely the inclined guide surface 62, the wall portions of the two first guide holes 206, and the wall portions of the engaging grooves of the outer annular portion 214) to clamp the pin 40 securely in position, which coupled with the abutting surface 217 of the blade 2 abutting against the stop surface 61 of the stop block 60 enhances the stability of the blade 2 while the blade 2 is used in the fully extended position.

Referring to FIG. 7 to FIG. 12, a securing structure of a folding knife according to the second embodiment of the present invention includes a handle 1 and a blade 2. The handle 1 includes a main body 10, two side plates 20, two housing portions 30, a pin 40, a control element 70, two linking members 80, two elastic elements 50, and a stop block 60.

The main body 10 is elongated in shape.

The two side plates 20 are also elongated in shape and are provided on two opposite sides of the main body 10 respectively such that the main body 10 is sandwiched between the two side plates 20, with a space formed between the two side plates 20 in order to receive the blade 2. As the two side plates 20 have the same structure, only one side plate 20 is described below by way of example. The side plate 20 has two long-side edges defined respectively as an upper handle edge 201 and a lower handle edge 202. One end of the side plate 20 is provided with a pivotal connection hole 203. The end of the side plate 20 that is provided with the pivotal connection hole 203 is defined as a front handle end 204 while the opposite end of the side plate 20 is defined as a rear handle end 205. The side plate 20 is provided with a first guide hole 206, a second guide hole 207, and a third guide hole 208, the three of which are sequentially arranged at intervals in a direction from the front handle end 204 toward the rear handle end 205. The major-axis direction of each guide hole extends along the major-axis direction of the side plate 20, and both the end of the first guide hole 206 that is adjacent to the front handle end 204 and the end of the second guide hole 207 that is adjacent to the front handle end 204 are slightly curved toward the lower handle edge 202.

The two housing portions 30 are elongated in shape and are provided on the outer sides of the two side plates 20 respectively such that the two side plates 20 are located between the two housing portions 30.

The pin 40 extends through the first guide hole 206 of each side plate 20, and the two ends of the pin 40 jut out from the two side plates 20 respectively.

The control element 70 is provided between the two side plates 20 and between the main body 10 and the blade 2. The top side of the control element 70 is provided with a pushing portion 71. The pushing portion 71 extends outward beyond the upper handle edges 201 of the two side plates 20 and is therefore exposed to view. Two opposite sides of the control element 70 are each provided with a first post 72 and a second post 73. Each first post 72 extends through the third guide hole 208 of the corresponding side plate 20, and each second post 73 extends through the second guide hole 207 of the corresponding side plate 20, such that the control element 70 can be moved along the major-axis directions of the third guide holes 208 in order to be switched between a locking position and an unlocking position.

The two linking members 80 are located on the outer sides of the two side plates 20 respectively. Each linking member 80 has one end connected to the corresponding first post 72 of the control element 70 and the opposite end connected to the portion of the pin 40 that juts out from the corresponding side plate 20.

The two elastic elements 50 are provided on the outer sides of the two side plates 20 respectively. Each elastic element 50 has one end connected to the corresponding side plate 20 and the opposite end abutting against the corresponding first post 72 of the control element 70 in order to apply a restoring force to the control element 70 after the control element 70 is displaced. In this embodiment, the elastic elements 50 are springs.

The stop block 60 is sandwiched between the two side plates 20 and is adjacent to the front handle ends 204. The stop block 60 has a stop surface 61. The stop surface 61 abuts against an abutting surface 217 of the blade 2 when the blade 2 is in the fully extended position. The stop block 60 is also provided with an inclined guide surface 62. The inclined guide surface 62 is adjacent to the first guide holes 206 and is inclined in a direction from the upper handle edges 201 toward the lower handle edges 202 and the front handle ends 204. The end of the inclined guide surface 62 that is adjacent to the blade 2 is closer to the lower handle edges 202 than is the opposite end of the inclined guide surface 62.

The blade 2 includes a cutting-edge end 211 and a pivotal connection end 212. The pivotal connection end 212 is provided with a pivot shaft 213 and an outer annular portion 214. The blade 2 is pivotally connected to the pivotal connection holes 203 of the two side plates 20 via the pivot shaft 213. The outer annular portion 214 has a fan-like configuration extending about a center of circle defined by the pivot shaft 213. Moreover, the outer annular portion 214 is provided with a first engaging groove 215 and a second engaging groove 216, and the pin 40 can be engaged in either one of the two engaging grooves. The two engaging grooves define an included angle θ therebetween, and the included angle θ is at least greater than 90 degrees.

Figure 9:
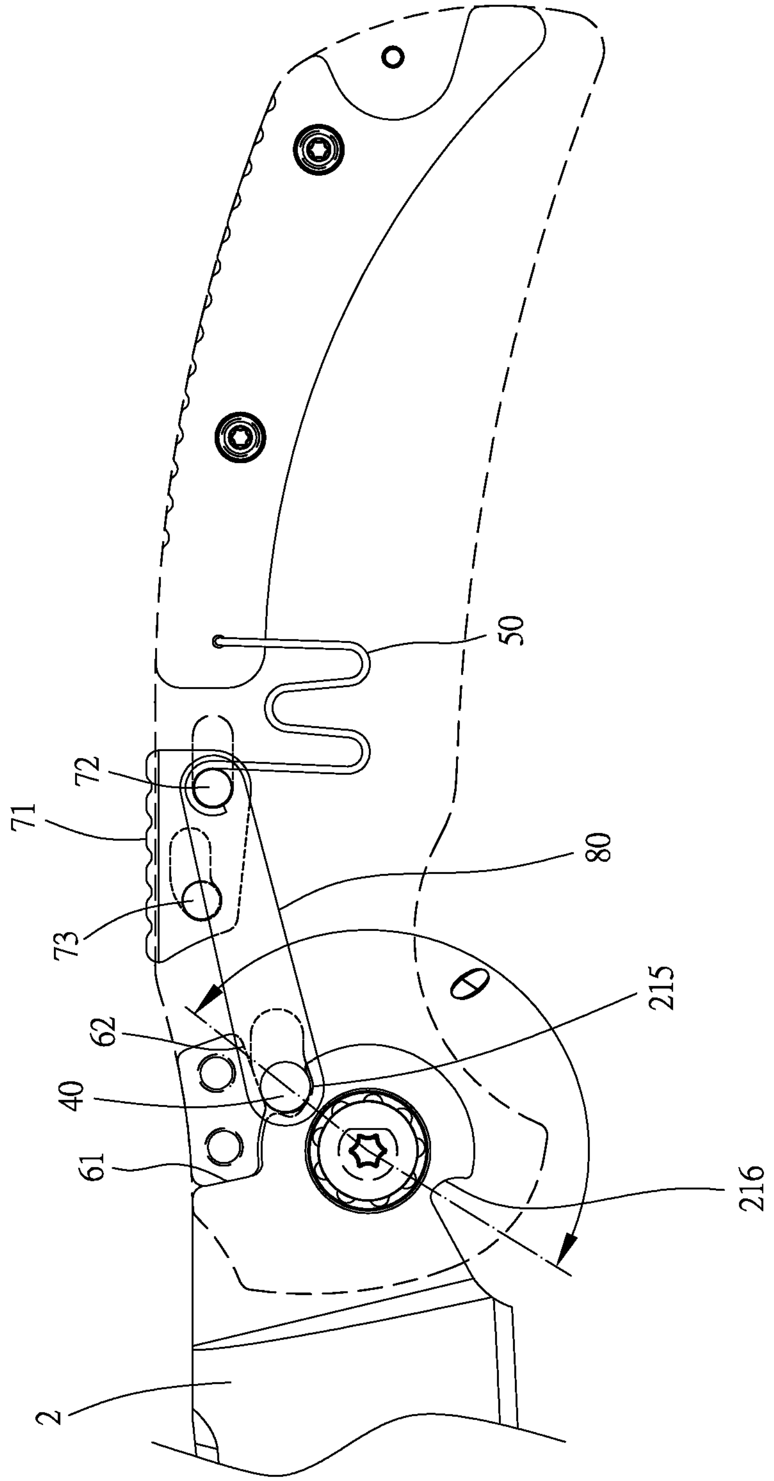
FIG. 9 is a left side view of the second embodiment of the invention, with the left housing portion removed.

The securing structure provided by this embodiment for a folding knife is shown in FIG. 9 in normal use, with the blade 2 in the fully extended position. The blade 2 in this position is exposed to view and extends forward from the handle 1, with the pin 40 engaged in the first engaging groove 215 of the pivotal connection end 212 and clamped between a wall portion of the first engaging groove 215 and the inclined guide surface 62 of the stop block 60 to secure the blade 2 against rotation. As the pin 40 is connected with the two linking members 80, which in turn are connected to the control element 70, the control element 70 in this state is kept at the locking position (which is adjacent to the blade 2) by the elastic force of the two elastic elements 50.

Figure 10:
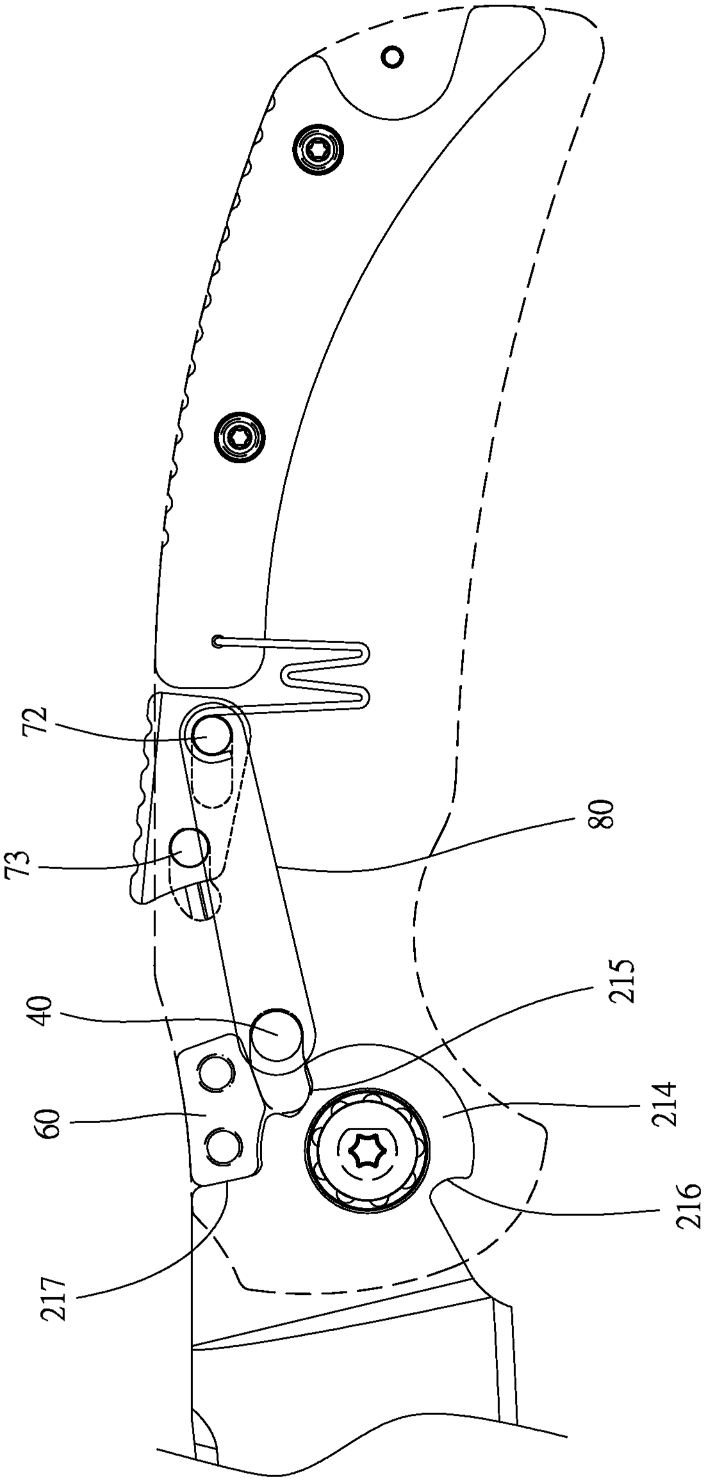
FIG. 10 is generally the same as FIG. 9 and shows a state of operation of an operating structure of the folding knife to which the second embodiment is applied.

To rotate and thereby fold the blade 2 away, the user begins by moving the control element 70 away from the blade 2 such that the control element 70 is moved from the locking position to the unlocking position and compresses the two elastic elements 50. When the control element 70 is moved, the two linking members 80 drive the pin 40 out of the first engaging groove 215 as shown in FIG. 10, thereby allowing the blade 2 to be rotated with respect to the handle 1 about an axis defined by the pivot shaft 213.

Figure 11:
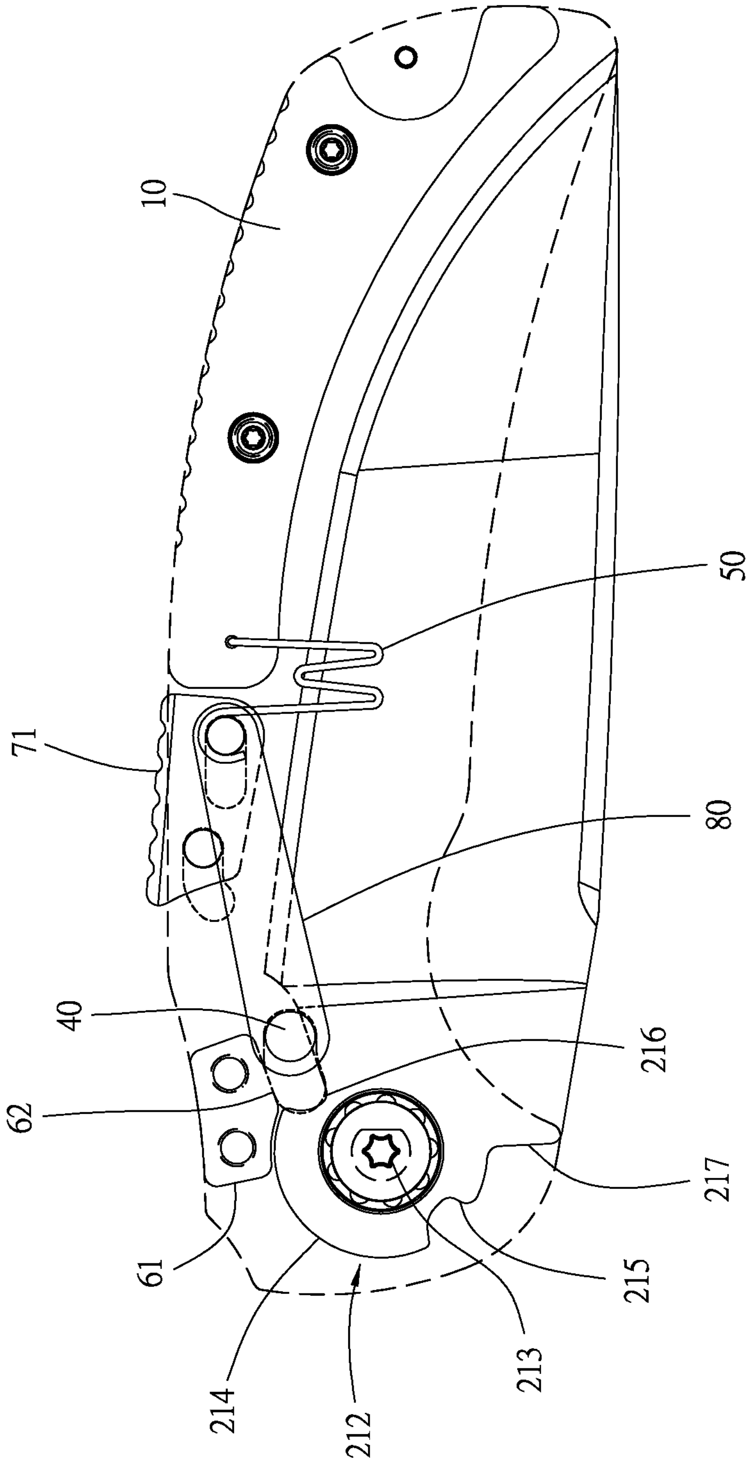
FIG. 11 is a left side view of the second embodiment of the invention, with the blade stored in the handle.
Figure 12:
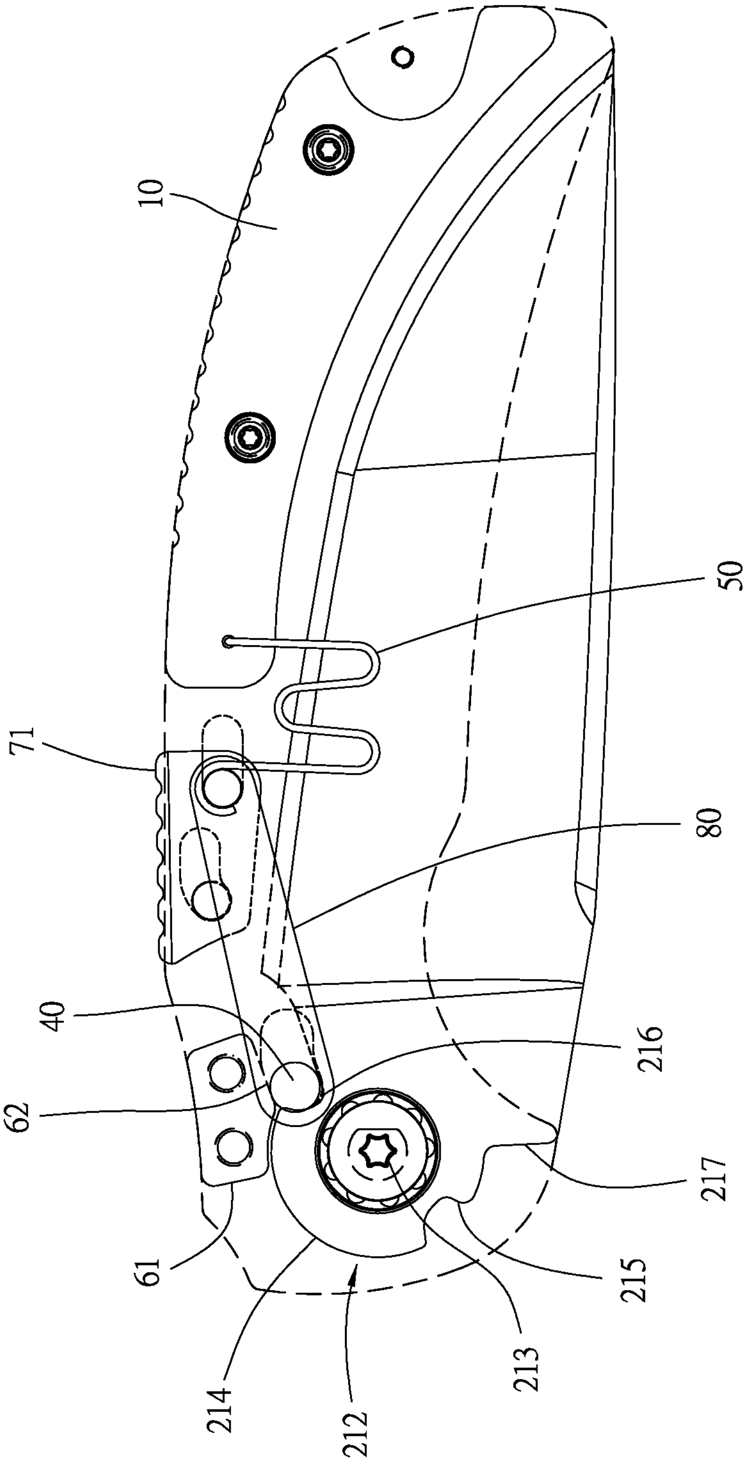
FIG. 12 is generally the same as FIG. 11 except that the blade is locked after being stored in the handle.

Once the blade 2 is rotated to the fully folded position, referring to FIG. 11 and FIG. 12, the user releases the control element 70 so that the control element 70 is pushed from the unlocking position back to the locking position by the restoring force of the two elastic elements 50. During the process, the two linking members 80 are driven to move the pin 40 forward into engagement in the second engaging groove 216 of the outer annular portion 214 to secure the blade 2 in place. As a result, the pin 40 is clamped between the inclined guide surface 62 of the stop block 60 and a wall portion of the second engaging groove 216 to prevent the blade 2 from further rotation, and the pin 40 itself is kept from coming out of the second engaging groove 216.

According to the structure of the second embodiment of the present invention, the pin 40 is moved by the control element 70 driving the two linking members 80 to move the two ends of the pin 40 respectively at the same time. A user, therefore, can move the two ends of the pin 40 simultaneously by sliding the control element 70 with only one finger, and the two ends of the pin 40 will not move in an unparallel manner. This enhances the convenience of use of the folding knife to which the invention is applied.

Figure 13:
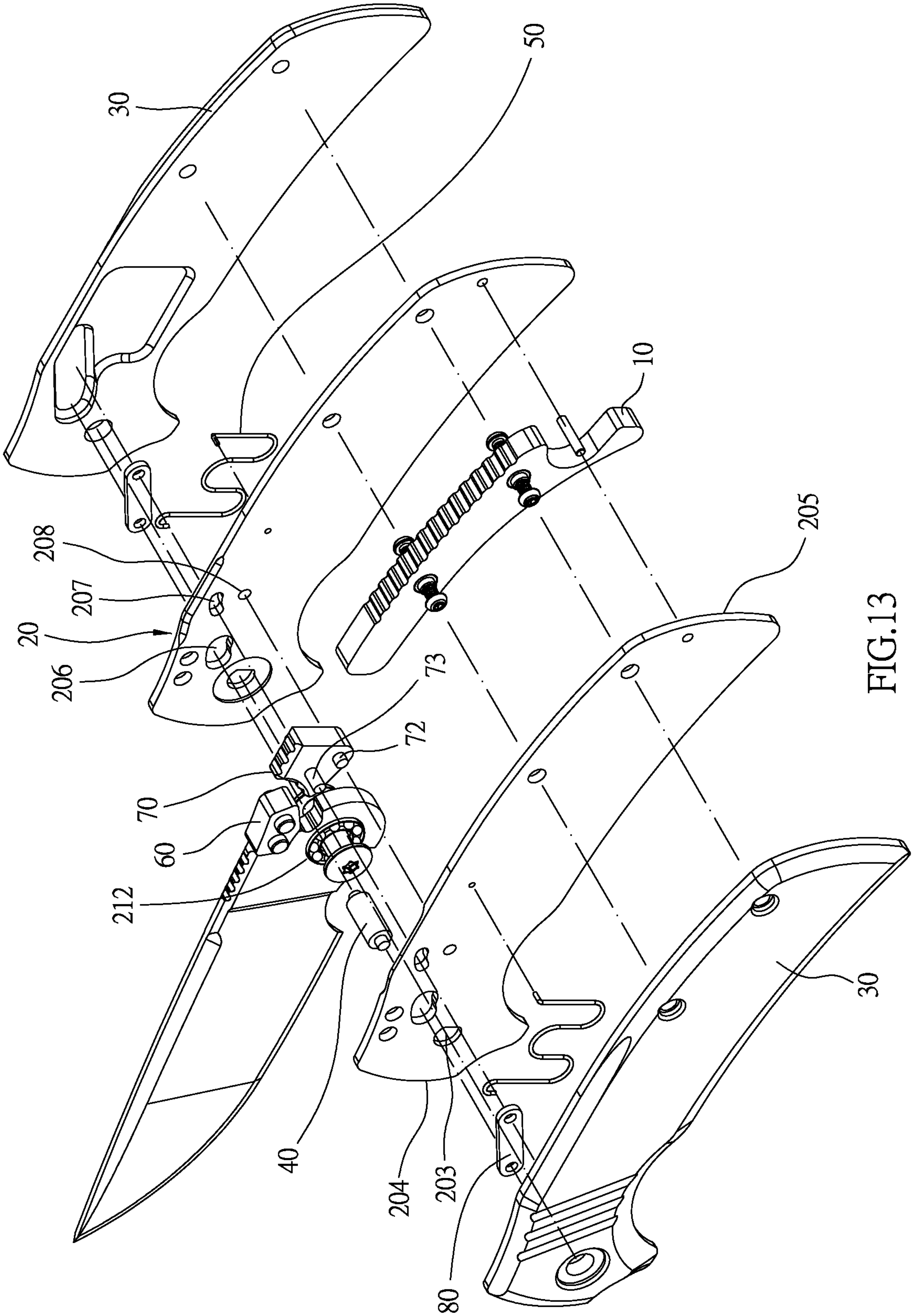
FIG. 13 is an exploded perspective view of the third embodiment of the invention.
Figure 14:
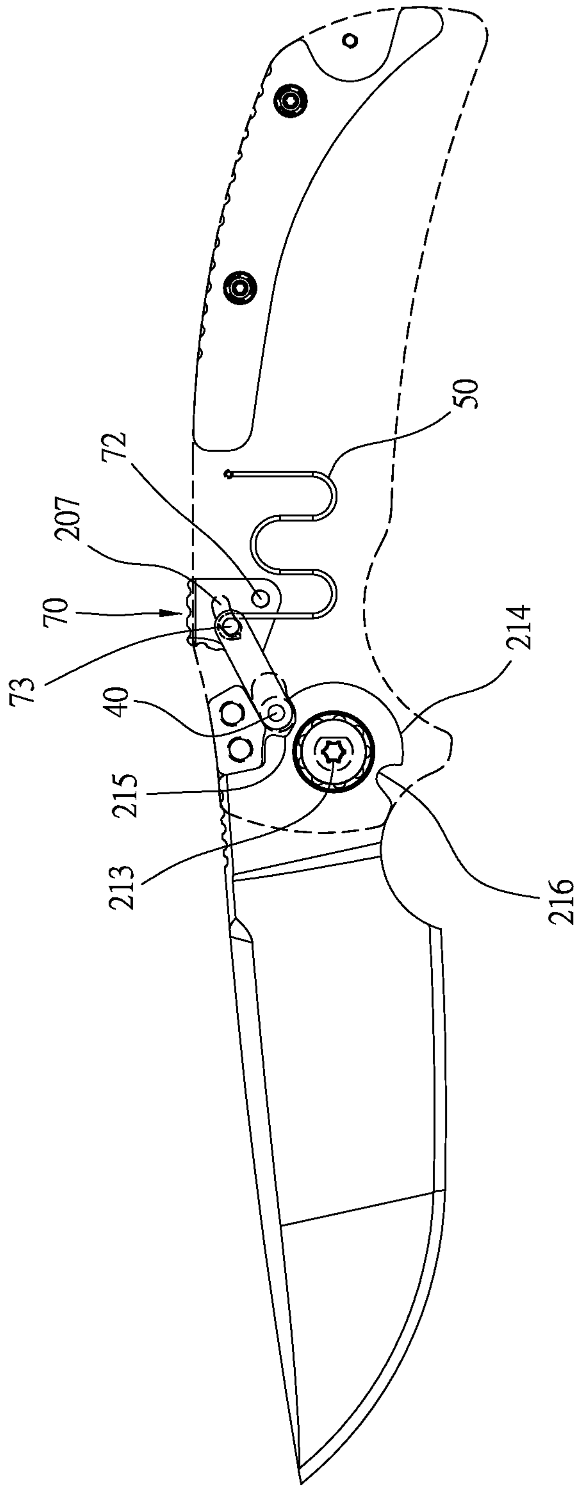
FIG. 14 is a left side view of the third embodiment of the invention, with the left housing portion removed.
Figure 15:
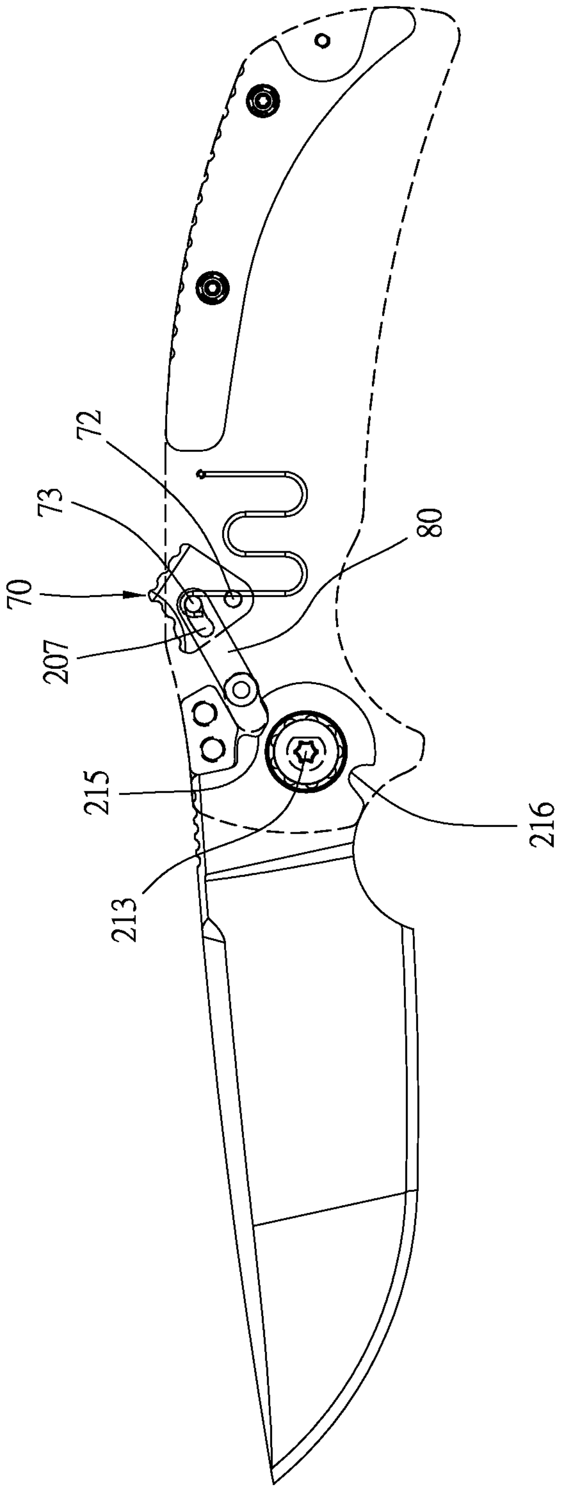
FIG. 15 is generally the same as FIG. 14 and shows a state of operation of an operating structure of the folding knife to which the third embodiment is applied.

FIG. 13 to FIG. 15 show the third embodiment of the present invention. The structure of the third embodiment is generally the same as that of the second embodiment except that the third guide holes 208 in the two side plates 20 are circular holes, and that each second guide hole 207 is in the shape of an arc whose center of circle is defined by the corresponding third guide hole 208. The control element 70 is provided between the two side plates 20 and between the main body 10 and the blade 2. The control element 70 has two opposite sides each provided with a first post 72 and a second post 73. Each first post 72 extends through the third guide hole 208 of the corresponding side plate 20, and each second post 73 extends through the second guide hole 207 of the corresponding side plate 20, such that the control element 70 can be pivoted about a rotation axis defined by the first posts 72.

The two linking members 80 are connected to the second posts 73 and the pin 40, and each of the two elastic elements 50 abuts against the corresponding second post 73 and the corresponding side plate 20.

The structure of the third embodiment works in generally the same way as that of the second embodiment except that the control element 70 in the third embodiment is configured for pivotal movement rather than the forward-backward movement in the second embodiment. However, the control element 70 in the third embodiment is equally capable of driving the two linking members 80 at the same time in order for the linking members 80 to move the pin 40.

To rotate and thereby fold the blade 2 away, the user begins by pivoting the control element 70 away from the blade 2 such that the control element 70 is rotated from the locking position to the unlocking position about the rotation axis defined by the second posts 73 and compresses the two elastic elements 50. When the control element 70 is pivoted, the two linking members 80 drive the pin 40 out of the first engaging groove 215 as shown in FIG. 15, thereby allowing the blade 2 to be rotated with respect to the handle 1 about an axis defined by the pivot shaft 213.

Once the blade 2 is rotated into and stored in the handle 1, the user releases the control element 70 so that the control element 70 is pushed, or pivoted to be exact, from the unlocking position back to the locking position by the restoring force of the two elastic elements 50. During the process, the two linking members 80 are driven to move the pin 40 forward into engagement in the second engaging groove 216 of the pivotal connection end to secure the blade 2 in place.

What is claimed is:

1. A securing structure of a folding knife, comprising: a handle and a blade, the blade being pivotally connected to the handle so as to be switchable between a fully extended position and a fully folded position, wherein the handle comprises:

a main body;

two side plates provided in such a way that the main body is sandwiched between the two side plates, wherein each of the two side plates has two long-side edges defined respectively as an upper handle edge and a lower handle edge, each of the two side plates has an end provided with a pivotal connection hole and defined as a front handle end and has an opposite end defined as a rear handle end, each of the two side plates is provided with a first guide hole, a second guide hole, and a third guide hole, and the first to the third guide holes of each said side plate are sequentially arranged from a corresponding said front handle end toward a corresponding said rear handle end;

two housing portions provided on outer sides of the two side plates respectively such that the two side plates are located between the two housing portions;

a pin extending through the first guide hole of each said side plate, wherein the pin has two ends jutting out from the side plates respectively;

a control element provided between the two side plates, wherein a pushing portion of the control element extends outward beyond the upper handle edges of the two side plates, wherein the control element has two opposite sides, each side of the control element is provided with a first post and a second post, each said first post extends through the third guide hole of a corresponding said side plate, and each said second post extends through the second guide hole of a corresponding said side plate, such that the control element is pivotable about a rotation axis defined by the first posts and hence switchable between a locking position and an unlocking position;

two linking members, each one of the two linking members provided on the outer side of each of the two side plates, respectively, wherein each said linking member has an end connected to a corresponding said second post of the control element and an opposite end connected to a corresponding said end of the pin; and a stop block sandwiched between the two side plates, wherein the stop block is provided with an inclined guide surface, and the inclined guide surface has an end adjacent to the blade; and the blade comprises a cutting-edge portion and a pivotal connection end, wherein the pivotal connection end is provided with a pivot shaft and an outer annular portion, the blade is pivotally connected to the pivotal connection holes of the two side plates via the pivot shaft, the outer annular portion is provided with a first engaging groove and a second engaging groove, the pin is engageable in either of the first engaging groove and the second engaging groove, and a portion of a cutting edge of the cutting-edge portion proximate to the front handle end is closer to the lower handle edges of the two side plates than the upper handle edges, wherein when locking the blade in the fully extended position, said pin is moved directly by the linking members, which are moved by switching the control element from the unlocking position to the locking position, into engagement with the first engaging groove and against the stop block, wherein when switching the blade from the fully extended position to the fully folded position, said pin is moved directly by the linking members, which are moved by switching the control element from the locking position to the unlocking position, out of the first engaging groove, and when locking the blade in the fully folded position, said pin is moved directly by the linking members, which are moved by switching the control element from the unlocking position to the locking position, into engagement with the second engaging groove and against the stop block.

2. The securing structure of a folding knife as claimed in claim 1, wherein each said second guide hole has an arc shape with a center of circle defined by a corresponding said third guide hole.

3. The securing structure of a folding knife as claimed in claim 2, wherein the stop block has a stop surface, and the stop surface abuts against an abutting surface of the blade when the blade is in the fully extended position.

4. The securing structure of a folding knife as claimed in claim 3, further comprising at least one elastic element, wherein the elastic element has an end connected to a corresponding one of said two side plates and an opposite end abutting against a corresponding said second post of the control element.

* * * * *